United States Patent Office 3,204,079
Patented Aug. 31, 1965

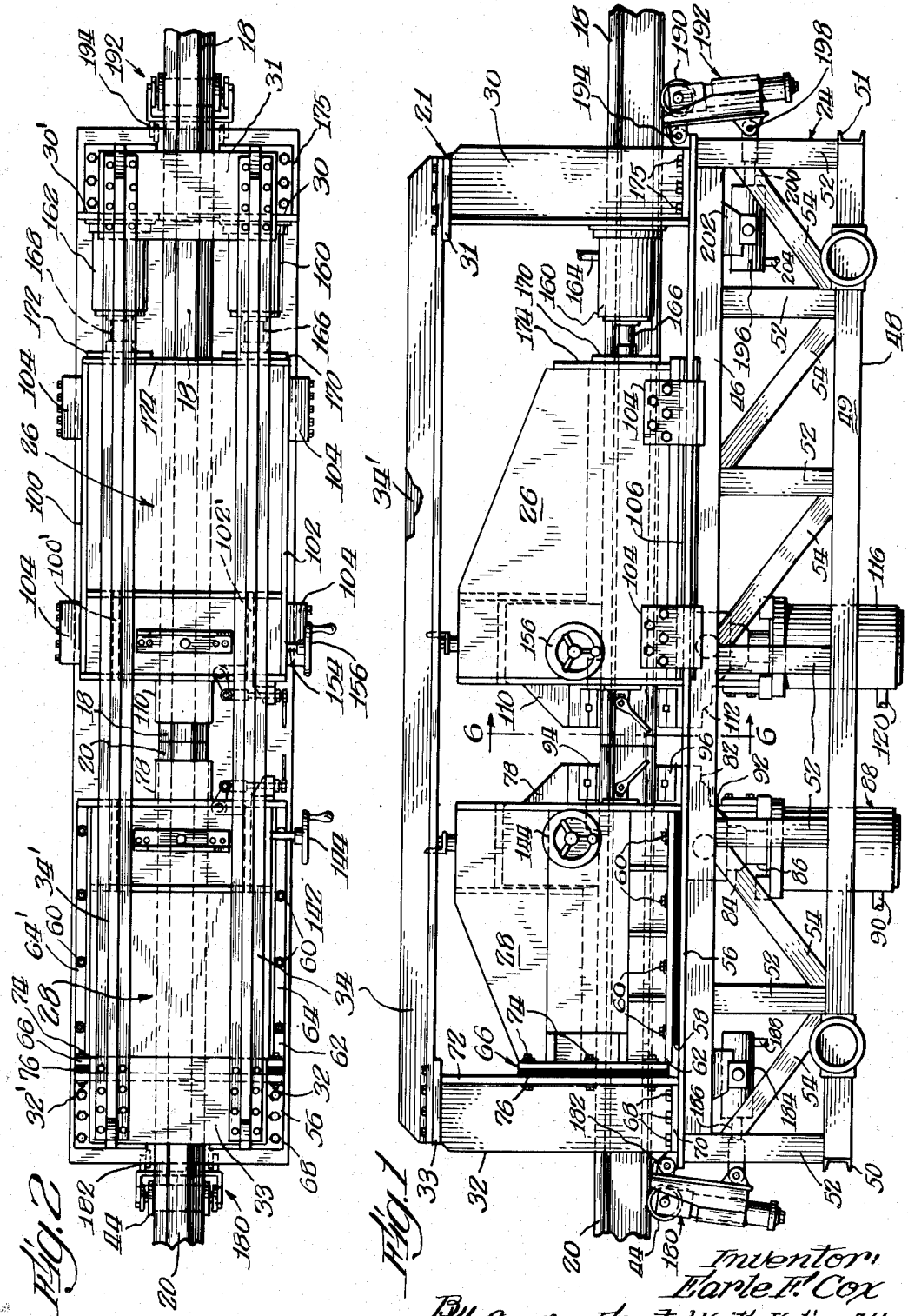

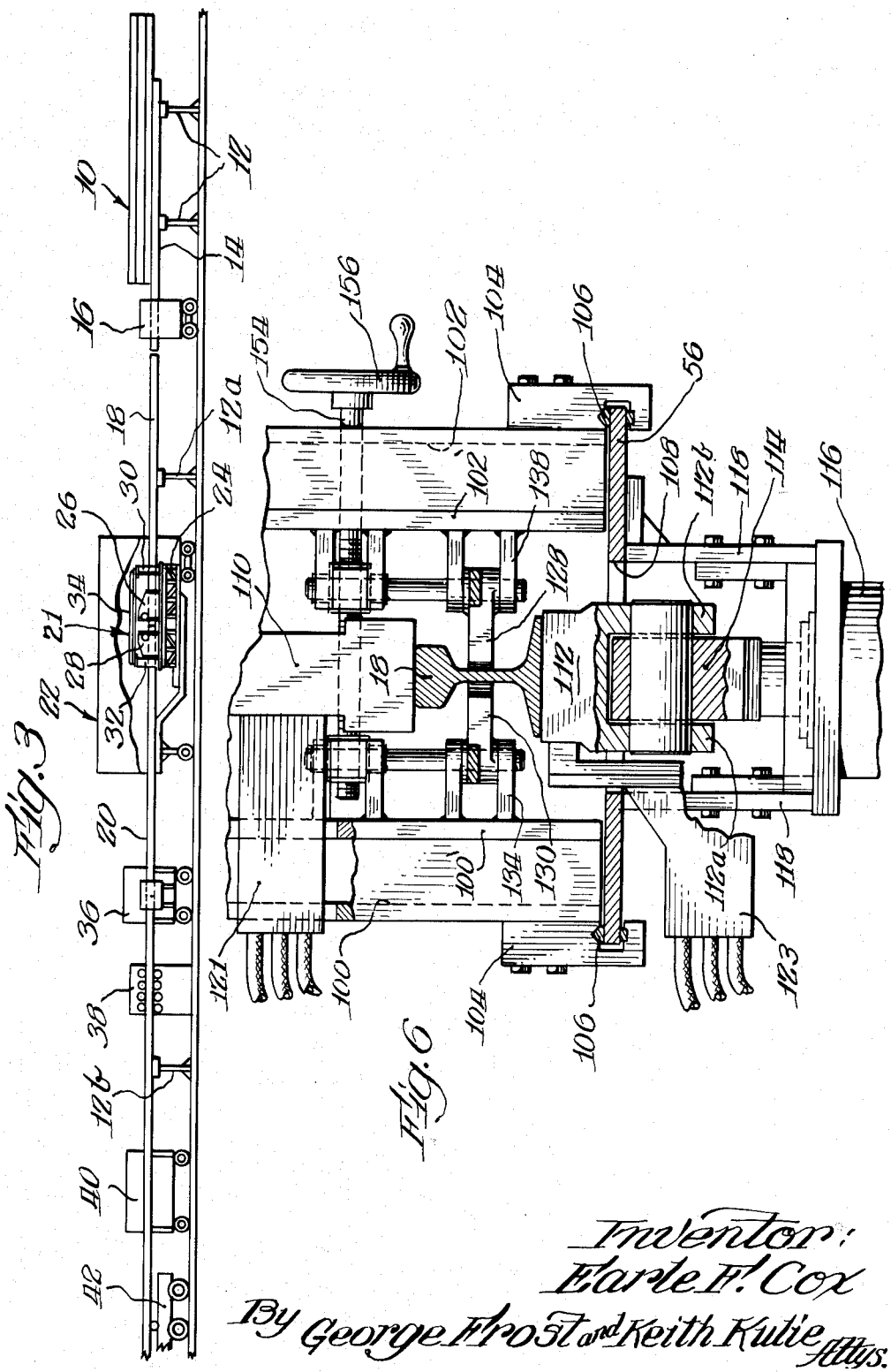

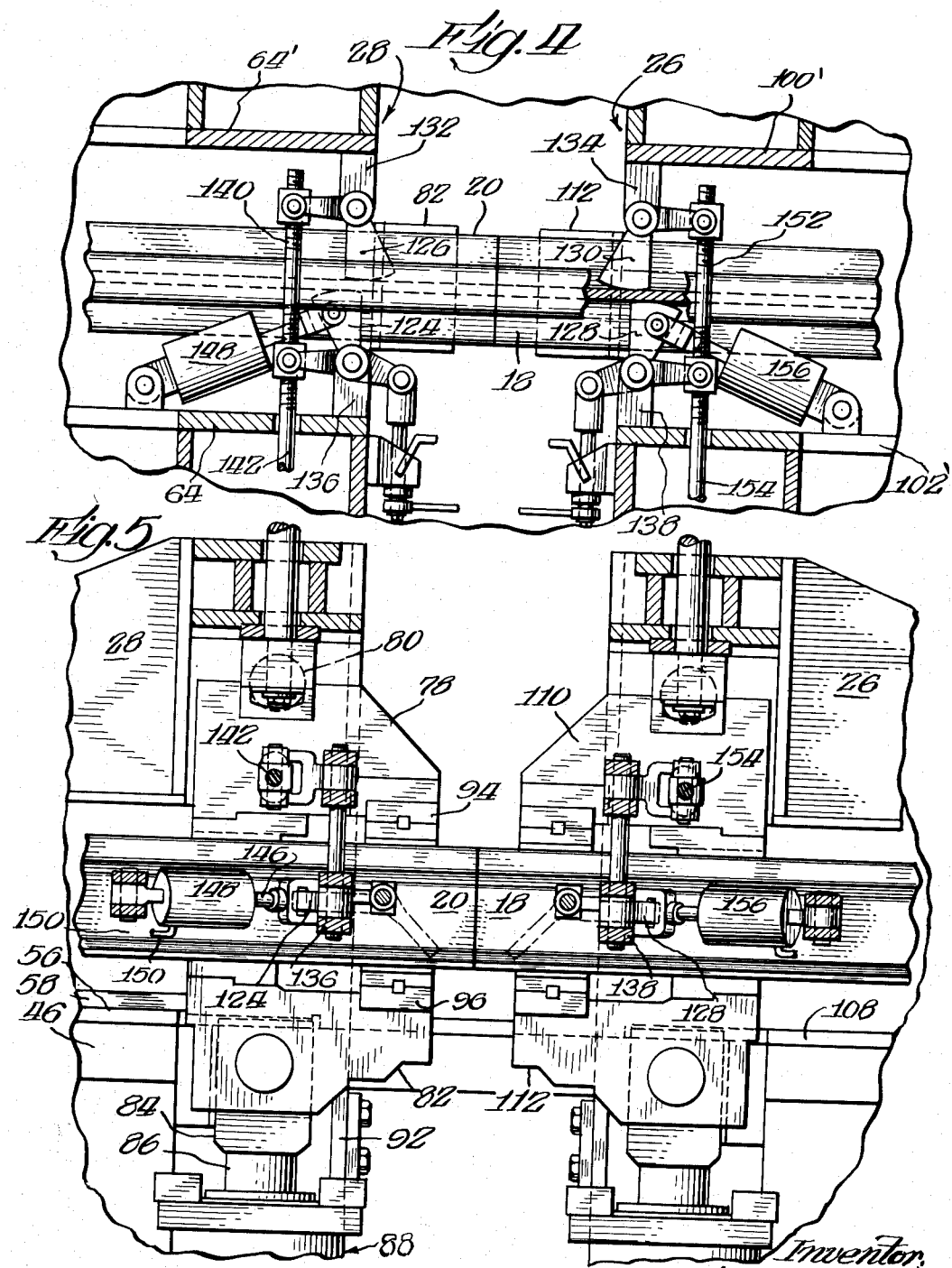

---

3,204,079
WELDING MACHINE FOR RAILS OR THE LIKE
Earle F. Cox, Western Springs, Ill., assignor to Chemetron Corporation, Chicago, Ill., a corporation of Delaware
Filed May 2, 1962, Ser. No. 191,949
5 Claims. (Cl. 219—101)

The present invention relates to a welding device for use in welding railroad rails or the like and more particularly it relates to an improved construction for welding machines wherein the forces developed in the pressure welding operation are absorbed in tension.

In the apparatus of the present invention two rails, or similar objects, are brought in end-to-end relation, one being carried by a fixed insulated head and the other being carried by a movable head. The movable head is urged toward said fixed head to bring the adjacent ends of the rails into pressure engagement and to effect interfacial fusion of the adjacent ends. In this form of welding the juxtaposed ends of the objects to be joined are first heated to a plastic condition prior to the pressure engagement of the movable object with the fixed object. Fusion of the mating ends is accomplished more readily with considerably less pressure through the application of heat to the ends of the objects.

A welding machine of the type characterized herein is more completely described in Patent 2,911,516, which issued on November 3, 1959.

In welding machines of the type shown in my Patent 2,911,516 (noted above) the fixed and movable head members are required to be mounted upon a sturdy, very substantial support. A support of this type is essential in that high forces are developed in a pressure welding method of joining rails or the like and the entire load is resisted in the bed of the apparatus. In order to keep the rail heads in mutually aligned relation it is essential that the bed or support be substantial enough to resist the bending moments developed about the central portion of the machine without deviation from its fixed position.

With the machine of the present invention the need for the very sturdy and heavy support structure of the prior machines is obviated by the provision of force absorbing members which absorb the forces developed in the pressure welding operation in uniform fashion.

The welding machine of the present invention includes fixed and movable heads, each of said heads having clamp means associated therewith to clamp and align the rails with the rail ends protruding from the clamp means a short distance in mutually aligned relation.

In the welding operation, current flows from the fixed (insulated) head to the rail carried thereby to the other rail and then to the movable head to provide localized heating at the abutting rail ends for welding action. In the complete welding operation the ends of the rails are brought together by sliding the movable head (and the rail carried by it) into engagement with the rail carried by the fixed head and then applying an initial current flow to heat the abutting rail ends to a plastic condition suitable for welding. The movable head is then drawn back along the base away from the fixed head to separate the abutting rail ends and to allow the heat to spread within the rail body. A flashing process is then initiated until the rail ends are heated to welding temperature. The upset operation is then performed by bringing the rail ends together under pressure to complete the weld.

The rails are gripped and indexed in each head by vertically acting jaws and horizontally jamming dogs. Each pair of jaws associated with each head includes a top indexing jaw which is vertically movable over a limited range to adjust the vertical rail positions to assist in mutual vertical alignment of the juxtaposed ends. The rail is initially lifted by a jack located remotely from the joint to bear lightly against the upper jaw. After the horizontal jamming dogs have been set, a power operated complementary lower lifting jaw serves to press each rail into seating engagement with the top or indexing jaw. The jamming dogs serve to align and index the rails laterally.

A pair of vertical support columns back up each of the heads of the welding apparatus, the movable head being supported through means adapted to urge said head slidably along the base. A pair of tension members extend longitudinally between the vertical support columns and are rigidly affixed thereto at the terminals of said columns. In this manner the compressive or shear stress transferred from the heads to the vertical support columns is transferred to and absorbed by the tension members, in tension.

It is therefore a general object of the present invention to provide an improved welding machine.

An additional object of the present invention is to provide an improved welding machine having structural members adapted to absorb, in tension, the forces developed in the pressure welding operation.

It is another object of the present invention to provide an improved welding machine for rails or the like in which the forces developed in the pressure welding operation are absorbed by a pair of tension members disposed above and below the rail ends being welded.

A further object of the present invention resides in the provision of an improved welding machine wherein the supporting structure may be made relatively light.

An additional object of the present invention is in the provision of an improved welding machine for use in a pressure welding operation wherein the forces developed in the welding operation are absorbed in tension by suitable members affixed to said welding machine and where the supporting structure for said machine may be relatively light in that it is not required to resist the forces developed in the pressure welding operation.

Another object of the present invention is to provide an improved welding machine for rails or the like using heads with vertically movable jaws to position and clamp the rail in predetermined position and having vertical and horizontal force absorbing members adapted to absorb the forces developed in the welding operation.

It is a further object of the present invention to provide a welding machine for rails or the like embodying features of construction, combination and arrangement making it simple and inexpensive in construction, reliable in operation, and adapted to practical rail-welding operation.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is a side elevational view of the welding machine of the present invention;

FIGURE 2 is a top plan view illustrating in greater detail the top tension members and their interconnection to the upper terminals of the vertical columns;

FIGURE 3 is a schematic representation of the continuous rail welding process in which the welding machine of the present invention is employed;

FIGURE 4 is a fragmentary view of the lateral rail clamping members;

FIGURE 5 is a fragmentary view of the vertical clamp jaws associated with the fixed and movable heads, respectively, of the welding machine of the present invention; and FIGURE 6 is a fragmentary view of the rail clamping head taken along lines 6—6 of FIGURE 1.

Referring now more particularly to FIGURE 3, there is represented schematically, a complete unit for welding a plurality of short rails into a continuous, relatively long rail. This unit includes a rail storage mechanism, indicated generally at 10, in which a plurality of short rails are stored and are delivered to the rail supports 12 when ready to be used. The rail 14 is delivered along the rail supports 12, which rail supports may include driven rollers to facilitate rail transfer, through a scale removal device 16 which serves to remove the oxidized portions in the electrode bearing area. Normally the front end of rail 14 is in abutting or closely spaced, but unsecured, relation to the back end of rail 18. The front end of rail 18 has just been welded or is about to be welded, as shown in FIGURE 3. An additional support 12a sustains the rail 18, as shown.

The welding mechanism 21 is shown as mounted in the trailer 22, which may be a highway trailer or, in the alternative, may be provided with wheels for rail operation. This mechanism 21 includes a base or support, indicated generally at 24, an uninsulated movable welder head 26, and an insulated fixed welder head 28. The heads 26 and 28 are backed up by vertical columns 30—30' and 32—32', respectively, the upper terminals of the vertical columns being rigidly interconnected by a force dissipating member 34. It should be observed that the columns 30—30' and 32—32' may be tied together intermediate the terminals thereof to functionally define a single rigid column at either end of the machine. As noted in detail hereinafter, the heads 26 and 28, respectively, are provided with rail clamping and gripping means which serve to index, position and clamp the rail in tight fashion in predetermined vertical and lateral position.

Beyond the trailer 22 is a flash removal mechanism 36 which serves to remove the flash formed at the welded rail joint. The welded rail 20 then travels through the rail advancing mechanism 38, over support 12b to the inspection car 40, and thence to the flat cars 42, only a part of one of which is shown, extending for a sufficient distance to carry the entire length of a welded rail section.

In the operation of the welding mechanism 21, as shown more clearly in FIGURE 1, the rail 20 is partly supported by roller 44 and clamped and gripped tightly and held in fixed position by the action of the fixed head 28 as hereinafter noted. The rail 18 is clamped and gripped tightly by the movable head 26 which is disposed for movement along the support bed 24. During the welding operation an electric current flow takes place between rails 18 and 20 to heat the joint therebetween (since the electrical resistance at the abutting end is at a high value) and thereby bring the metal at the joint area to the plastic state for forming the weld under pressure.

During the operation of the mechanism the rail 20 is pulled by the advancing mechanism 38 to the point where it is approximately in the position indicated in FIGURE 1, wherein the free, unwelded end of the rail is positioned just out-board the clamping jaws, described below, of the fixed head 28. The rail 18 is then brought to abutting end-to-end position in relation to the rail 20 and the vertical and lateral position of the rail 18 adjusted as hereinafter described until the two rails are in mutually aligned end-to-end position. The clamping means associated with the movable head 26 then clamp and grip the rail 18. The operator then passes an initial current flow between the rails 18 and 20 to heat the abutting ends to a plastic condition. The head 26 and rail 18 are then both moved away from and into spaced relation with the fixed head 28 and rail 20 to permit the heat to spread and uniformly heat the interface to be welded. A flashing step follows which brings the rail ends to welding temperatures. When the rail ends are heated to welding temperature, the rails are forced together in end-to-end relation, the current flow is interrupted, and the weld is completed. The rails are held rigidly in the end-to-end relation until the newly welded joint is sufficiently cool, at which time the rail 20 is drawn from the welding machine by the advance mechanism 38 and a new rail is brought into position to be welded. Successive rails are thus welded in end-to-end relation until the desired length of welded rail is provided.

The support 24 for the welding machine 21 is defined by spaced upper and lower beds 46 and 48, respectively. The lower bed 48 may be formed by a pair of beams 49 extending longitudinally the length of the bed and being fastened at each end by U-channels 50 and 51 extending therebetween to form a rigid box-like frame. The upper bed 46 may be formed in the same manner and is supported above the lower bed 48 by a plurality of upstanding support members 52, each of said upstanding support members 52 being braced with respect to each other and to the upper and lowed beds 46 and 48, respectively, by angularly related braces 54. A top plate 56 is affixed to the upper bed 46 of the support 24, said top plate extending therealong from end to end of the support member 24.

The head 28 is immovably fixed on the support 24 and is supported from the support by the top plate 56. An insulating sheet 58 is interposed between the head 28 and the top plate 56 to provide electrical insulation therebetween. The head is affixed to the top plate 56 by a plurality of bolts 60 which bolt sextend through a flange 62, integral with the head 28, and thence through the insulating sheet 58 and top plate 56, being fastened at the underside of the top plate 56. It should be noted that electrically insulating washers may be interposed between the bolt heads and the flange 62 to electrically insulate the bolts from the head 28.

The support structure of the fixed head 28, which includes the plates 64 and 64', FIGURE 2, terminates in a cross plate 66. The cross plate 66 extends outwardly a slight distance beyond the plates 64 and 64' to define a flange portion at the outer terminals thereof.

A vertical support column 32—32' is affixed to the top plate 56 of the support 24 by means of a plurality of bolts 68 which bolts extend through a flange 70 of the member 32 and thence through the top plate 56 to be fastened at the underside thereof. It should be observed that the column 32—32' may be affixed to plate 56 by welding thereto. The vertical column 32—32' is provided with a flange 72 disposed toward the fixed head 28. The outwardly extending flanges of the cross plate 66 are affixed to the flanges 72 of the vertical column 32—32' by a plurality of bolts 74. An insulating pad 75 is interposed between the head 28 and the vertical column so as to electrically insulate the fixed head with respect to said column and to complete the isolation of the head 28 from the support 24 and column 32—32'. The insulating pad 76 is subject only to compressive stress when the movable head 26 forcibly brings the rail 18 against the rail 20, as described above. The bolts 74 are insulated from head 28 and the column 32—32' by means of insulating washers which are interposed between the flanges of said members and the heads of said bolts.

The vertical position of the rail 20 is determined by the vertical position of the top or indexing jaw 78 of the fixed head 28, which jaw serves as the vertical reference member. The jaw 78 is pivotally supported by pin 80 and is vertically adjustable over a limited distance, such vertical adjustment means being illustrated and described by my Patent 2,911,516, noted above.

The rail 20 is clamped upwardly and against the top jaw 78 by the bottom jaw 82. The jaw 82 is carried by a stub shaft 84, which in turn is interconnected to the piston rod 86 of the piston-cylinder unit 88. The cylinder 88 is a hydraulic cylinder and receives oil under pressure from a booster (not shown) which is supplied with air under pressure through an insulated hose 90. The cylinder 88 is mounted to the support member 24 by a plurality of depending members, one of which is shown at 92.

Jaws 78 and 82 are provided with a water-cooled portion 94 and 96, respectively, which portion of each jaw engages the rail 20. The water-cooled plates are essential due to the excessive heat generated during the pressure welding operation.

The movable head 26 is defined by a pair of side plates 100 and 100', and 102 and 102' at each side thereof, FIGURES 2, 4 and 6. Fastened to these plates are a plurality of support and guide members 104, each of which may be secured to said plates by a plurality of bolts, as shown in FIGURE 2. The members 104 are adapted to be guidingly supported along ways 106, FIGURE 6. The ways 106 are affixed to the top plate 56. As indicated in FIGURE 6, the top plate 56 is provided with a central opening 108 adapted to receive the depending portion of the movable head 26.

The movable head 26 is provided with an upper indexing jaw 110 to fix the vertical position of the rail 18 in welding position. The indexing jaw 110 is vertically adjustable in the same manner as that indicated for jaw 78 of head 28.

The rail 18 is clamped up against the indexing jaw 110 of the movable head 26 by the lower jaw 112. The jaw 112 extends downwardly into the bifurcated portion defining the clevis parts 112a and 112b. The clevis parts receive the stub shaft 114 which shaft is mounted integrally with the piston rod of the cylinder-piston unit 116. The cylinder-piston unit 116 is affixed to downwardly extending plates 118 which plates, in turn, are affixed to the top plate 56 of the support 24. The stub shaft 114 is urged upwardly by the unit 116 when desired by the application of oil through cylinder of the cylinder-piston unit 116. An insulated feed line 120 is provided for the access of oil from a pressure reservoir to the unit 116.

The jaws 110 and 112 serve as electrical contact elements with the rail 18. Each of these jaws receives the electrical connectors 121 and 123 which are of conventional type and serve to conduct the heavy welding currents from the sources (not shown) to the rail without interfering with the longitudinal sliding movement of the movable head 26.

The rail is gripped against axial movement in relation to the heads of the machine by vertical clamps and by the dogs 124, 126, 128 and 130, respectively. These dogs bears against the web of the rail to anchor the rail in lateral position with respect to the machine. The dogs 126 and 130 are pivotally anchored to the side plates 64' and 100 by rigid supports 132 and 134, respectively. Similarly, dogs 124 and 128 are pivotally anchored to side plate 64 and 102 by support members 136 and 138. The dogs 124 and 126 are adjustably interconnected by a tie rod 140. One portion of the crank arm of each of the dogs 124 and 126, respectively, is threadably received upon oppositely threaded portions at spaced intervals along the shaft 142 which comprises the tie rod 140. The spaced adjustment of the dogs 124 and 126 and therefore the lateral position of the rail effected thereby is realized by rotating the shaft 142 by means of the handwheel 144. The dog 124 is pivotally connected to the shaft 146 which shaft comprises the piston of the cylinder-piston unit 148. A supply line 150 leads from a pressure reservoir to the unit 148. The dogs are brought into rail engaging position by introduction of fluid pressure to the unit 148 through supply line 150. The faces of the dogs 124 and 126 engage the web of the rail and serve to affix the rail in axial alignment with respect to the head 28 of the rail welding machine 21.

The dogs 128 and 130 are pivotally interconnected by a tie rod 152 which tie rod provides a relative lateral adjustment of said dogs with respect to each other in the same fashion as outlined for that in conjunction with dogs 124 and 126, whereby the shaft 154 may be rotated by handwheel 156 to effect such adjustment. The dogs 128 and 130 serve to axially position the rail 18 with respect to the movable head 26 of the welding machine 21. The cylinder piston unit 156 is employed in bringing the dogs 128 and 130 into rail engaging position and in returning said dogs to rest position out of engagement with the rail web.

The movable head 26 is urged longitudinally of the support 24 by a pair of cylinder piston units 160 and 162. Each of the units 160 and 162 is provided with a pressure supply line 164 connected to a source of fluid pressure. The pistons 166 and 168 of the units 160 and 162, respectively, are affixed to back up plates 170 and 172, respectively. The back up plates in turn are affixed to the rear portion of the movable head 26 by bolting (or other suitable fastening means) to the cross plate 174 rigidly affixed to the rear of said head 26, as shown in FIGURE 2. The cylinders of the units 160 and 162 are each attached to the vertical support column 30.

The vertical support column 30 is affixed to the top plate 56 of the support 24 by a plurality of bolts 175.

The upper terminal of each of the vertiual columns 30—30' and 32—32' is provided with a flange 31 and 33, respectively. The upper tension members 34 and 34' are affixed at each end thereof as to the vertical support columns 30—30' and 32—32', respectively, by bolting said members to the flanges 31 and 33 of said columns.

The upper tension members 34 and 34' are disposed outboard the central axis of the welding machine 21 an equal distance on either side thereof.

In operation the rail 20 is vertically positioned and supported by the vertical clamping jaws 78 and 82 of the fixed insulated head 28, as noted above. The lateral positioning of the rail 20 is directed by the dogs 124 and 126. The rail 20 is supported outboard the welding machine 21 by the flanged guide and support roll 44. The roll 44 is pivotally supported by the support 180. Support 180 is pivotally attached to the support 24 as shown at 182, FIGURE 1. The cylinder-piston assembly 184 is pivotally interconneuted through piston rod 186 to the roll support member 180. The cylinder-piston assembly 184 is affixed to the support 24 and is provided with an insulated fluid pressure hose 188 to a source of fluid pressure (not shown). Introduction of pressure into the cylinder of the cylinder-piston assembly 184 will serve to rotate the roll bearing support 180 clockwise and will bring the roll 44 into engagement with the base of the rail 20 to lift and support said rail in the position desired.

The rail 18 is vertically positioned and supported by the jaws 110 and 112 of the movable head 26. Lateral positioning of the rail is realized through the dogs 128 and 130.

Rail 18 is supported outboard the welding machine 21 by the flanged guide roll 190, which roll is rotatably supported by member 192. The support member 192 is pivotally attached to the support 24 at 194. The cylinder-piston assembly 196 is pivotally attached to the member 192 at 198, as shown in FIGURE 1, through the piston 200 of said unit 196. The unit 196 is affixed to the support member 24 in conventional fashion, which may be, for example by a bracket 202 to which unit 196 is fastened.

A fluid pressure conducting hose 204 is interconnected between the cylinder of the cylinder-piston unit 196 and a fluid pressure supply (not shown). Introduction of pressure into the cylinder of the unit 196 will rotate the member 192 counterclockwise (in FIGURE 1) and bring the roll 190 into engagement with the rail 18 to lift and support the rail.

The movable head is moved along the guiding ways 106 on the base 24 to a position where the end of the rail 18 is in abutment with the end of the rail 20. The electric current is then passed through the rail by electrical contacts on each side of the rail joint, such as contacts 121 and 123, which current heats the rails. The rail 18 is then moved back away from the rail 20 for a sufficient time to permit the heat to be dissipated throughout the body of the rail adjacent the rail ends to avoid sharp thermal gradients. The flashing process is then started and is continued until the rail ends are at welding temperatures. At this time sufficient pressure is applied to force one end of the rail 18 into intimate pressure contact with the end of the rail 20 so that the interfacial area between said rails is joined in a welded joint to provide a continuous rail string of one additional rail length. The pressure to engage the rails 18 and 20 is supplied through the piston-cylinder units 160 and 162.

In the welding machine of the present invention the pressures developed in the pressure engagement of the heated rail ends to assure an interfacial weld are substantial. In order to avoid misalignment of the abutting rail ends during welding by having the support members of the machine deflect under action of the welding pressures the present invention employs a force absorbing unit that effectively resists the bending moments characteristic in such machines and dissipates said forces in uniform fashion.

In accord with the present invention each of the heads 26 and 28 (movable and fixed, respectively) is backed up by a vertical column 30 and 32, respectively. The head 26 is interconnected to the column 30 through the cylinder-piston units 160 and 162. The fixed insulated head 28 is directly rigidly affixed to the column 32. Each of the columns 30 and 32 are interconnected at their upper terminals by common tension members 34 and 34' to thereby define a rigid integral unit from the support 24 through the column 30, tension members 34 and 34', column 32 to the base 24. The resultant structural embodiment defines a composite, relatively light weight force absorbing unit effective to evenly distribute the forces developed in welding the rails.

It will be seen that upon application of pressure to the cylinder piston units 160 and 162 to urge the rail 18 into intimate pressure engagement with the rail 20, the compressive forces developed thereby will be transmitted to the vertical columns 30 and 32. The forces in head 28 will be directly resisted in the column 32 and the support 24 of the welding machine. The forces in head 26 will be the result of the pressure in cylinder-piston units 160 and 162 urging uniformly in all directions, both against the piston rods 166 and 168, respectively, to urge the head 26 toward the fixed head 28 and the rail 18 into pressure contact with the rail 20 and against the vertical column 30 which force is in force opposition to that applied to said piston rods to move the movable head toward said fixed head.

The compressive forces developed in the vertical columns 30 and 32 are effectively resisted, in tension, by the tension members 34 and 34' and the support 24.

In the prior welding machines the pressures developed in the welding operation were resisted in the bed or support of the machine. In view of this, as noted above, the support of the machines had to be made unusually heavy and strong to resist the bending moments imparted thereto to maintain the rail ends in mutually aligned position during the welding operation. In the machine of the present invention the support 24 is provided only as a support member to sustain the physical apparatus of the welding machine.

It should be observed that the forces developed in the welding operation are resolved into compressive and tensile forces and are resisted and dissipated as such with the novel structure of the present invention.

Metals usually are equally strong in tension or compression, or if any difference exists between the two, the compressive characteristics may be slightly favored. In view of the fact that the characteristic forces are resolved into both compressive and tensile forces the structural limitations permit the construction of a lighter, more durable machine. The bending forces are not inherent in such construction and thus the tendency for the rail ends to become misaligned during welding has been minimized and the welding operation rendered more satisfactory in character. It should be noted that the forces are resolved equally about the central axis of the welding machine in the present invention and thus there is a uniform distribution of forces into the force resisting members with greater assurance that the rail ends will be maintained in mutually aligned relation.

While I have shown and described a specific embodiment of the present invention it will, of course, be understood that other modifications and alternative constructions may be used without departing from the true spirit and scope of the invention. I therefore intend by the appended claims to cover all such modifications and alternative constructions as fall within their true spirit and scope.

I claim:

1. A device for welding rails wherein the welding operation is characterized by urging adjacent rail ends into end-to-end pressure engagement, comprising in combination:

a base;

first and second columns rigidly supported upon said base in relative spaced relation thereon;

a fixed head rigidly mounted on said base and affixed to said first column, said fixed head being disposed on said base between the first and second columns, said fixed head having vertical and lateral clamping means adapted to engage and to position said rail with respect to said head;

a movable head slidably supported on said base and adapted to be movable along said base toward and away from said fixed head, said movable head being disposed on said base between said second column and said fixed head, said movable head having vertical and lateral clamping means adapted to engage and to position said rail with respect to said head;

hydraulic means interconnected between said movable head and said second column, said hydraulic means adapted to urge said movable head along said base; and means rigidly interconnecting the upper and lower terminals of said first and second columns, respectively, to define force absorbing means effective to absorb forces developed in urging said rails in end-to-end pressure welding relation.

2. A device for welding rails wherein the welding operation is characterized by urging adjacent rail ends into end-to-end pressure engagement, comprising in combination:

a base;

first and second columns rigidly supported upon said base in relative spaced relation thereon, said first and second columns each being defined by a pair of vertically upstanding members;

a fixed head rigidly mounted on said base and affixed to said first column, the fixed head being disposed on said base between the first and second columns, said fixed head having vertical and lateral clamping means adapted to engage and to position said rail with respect to said head;

a movable head slidably supported on said base and adapted to be movable along said base toward and away from said fixed head, said movable head being disposed on said base between said second column and said fixed head, said movable head being vertical and lateral clamping means associated therewith adapted to engage and to position said rail with respect to said head;

means interconnected between said movable head and said second column, said means adapted to urge said movable head along said base; and connecting means rigidly interconnecting the upper terminals of said first and second columns, respectively, to define an assembly effective to absorb forces developed in urging said rails in end-to-end pressure welding relation.

3. A device for welding rails having a predetermined axis wherein the welding operation is characterized by urging adjacent rail heads into end-to-end pressure welding realtion comprising, in combination:

a base;

a first column vertically supported on said base;

a fixed head having a back face and being insulatingly supported by the base and with respect to said first column, the back face of said head being rigidly affixed to said first column, said fixed head having means adapted to engage a rail;

a second column vertically supported on said base opposite said first column;

a movable head slidably supported on said base and movable along said base toward and away from said fixed head, said movable head having means adapted to engage a rail;

means interconnected between said second column and said movable head and adapted to urge said movable head slidably along said base; and a pair of tension members interposed and rigidly affixed between said first and second vertical columns, respectively, and adapted to absorb the forces developed in urging said rails in end-to-end pressure welding relation.

4. A device for welding rails wherein the welding operation is characterized by urging adjacent rail ends into end-to-end pressure engagement, comprising in combination:

a base; said base having spaced upper and lower beds; and means rigidly connecting said upper and lower beds;

first and second columns rigidly supported upon said upper bed of said base in relative spaced relation thereon, said first and second columns each being defined by a pair of vertically upstanding members disposed in parallel relation to each other;

a fixed head rigidly mounted on said upper bed of said base and affixed to said first column and being insulatingly related to each, respectively, the fixed head being disposed on said upper bed between the first and second columns, said fixed head having vertical and lateral clamping means adapted to engage and to position said rail with respect to said head;

a movable head slidably supported on said upper bed and adapted to be movable along said upper bed toward and away from said fixed head, said movable head being disposed on said upper bed between said second column and said fixed head, said movable head having vertical and lateral clamping means associated therewith adapted to engage and to position said rail with respect to said head;

means interconnected between said movable head and said second column, said means adapted to urge said movable head along said upper bed; and connecting means rigidly interconnecting the upper and lower terminals of said first and second columns, respectively, to define a force resisting assembly effective to absorb forces developed in urging said rails in end-to-end pressure welding relation.

5. A device for welding rails wherein the welding operation is characterized by urging adjacent rail ends into end-to-end pressure engagement, comprising in combination:

a base; said base having spaced upper and lower beds; and means rigidly connecting said upper and lower beds;

first and second columns rigidly suported upon said upper bed of said base in relative spaced relation thereon; said first and second columns each being defined by a pair of vertically upstanding members;

a fixed head rigidly mounted on said upper bed and affixed to said first column, said fixed head having vertical and lateral clamping means adapted to engage and to position said rail with respect to said head;

movable head slidably supported on said upper bed and adapted to be movable along said upper bed toward and away from said fixed head, said movable head being disposed on said upper bed in substantially aligned relation to said fixed head, said movable head having vertical and lateral clamping means associated therewith adapted to engage and to position said rail with respect to said head;

means interconnected between said movable head and said second column, said means adapted to urge said movable head along said upper bed; and connecting means rigidly interconnecting the upper terminals of said first and second columns, respectively, to define a force resisting assembly effective to absorb forces developed in urging said rails in end-to-end pressure welding relation.

References Cited by the Examiner

UNITED STATES PATENTS

| | | | | |
|---|---|---|---|---|
| 2,212,393 | 8/40 | Dalton | | 219—101 |
| 2,761,952 | 9/56 | Totten | | 219—101 |

RICHARD M. WOOD, *Primary Examiner.*